Oct. 9, 1928.
R. M. CORMICAN
1,687,427
COMBINATION TRUNK AND LUGGAGE CARRIER
Filed Sept. 23, 1927   2 Sheets-Sheet 1
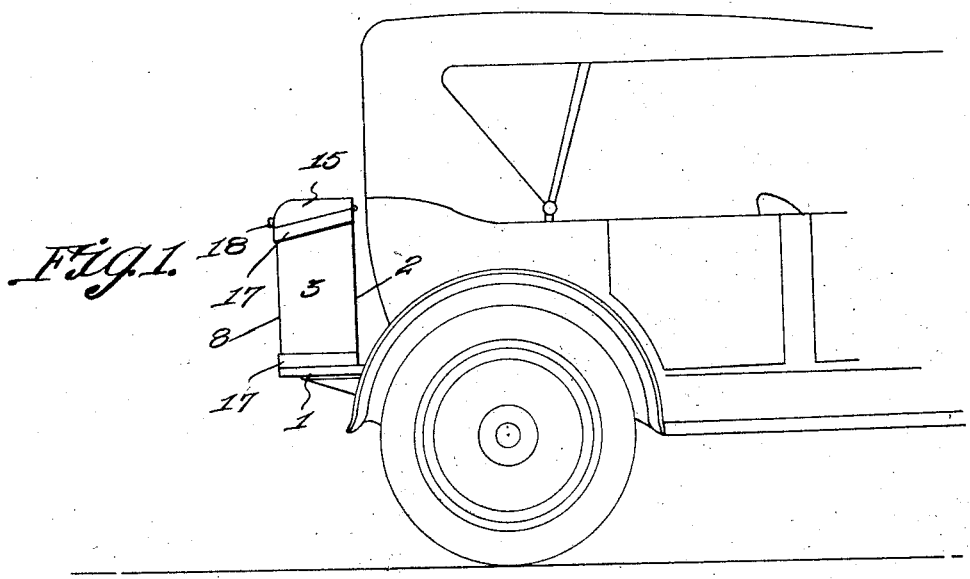
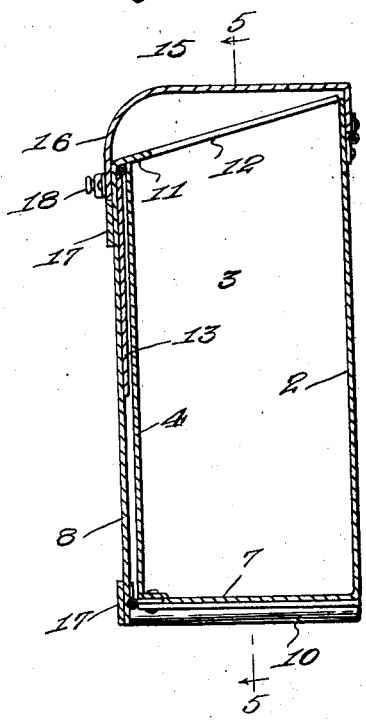
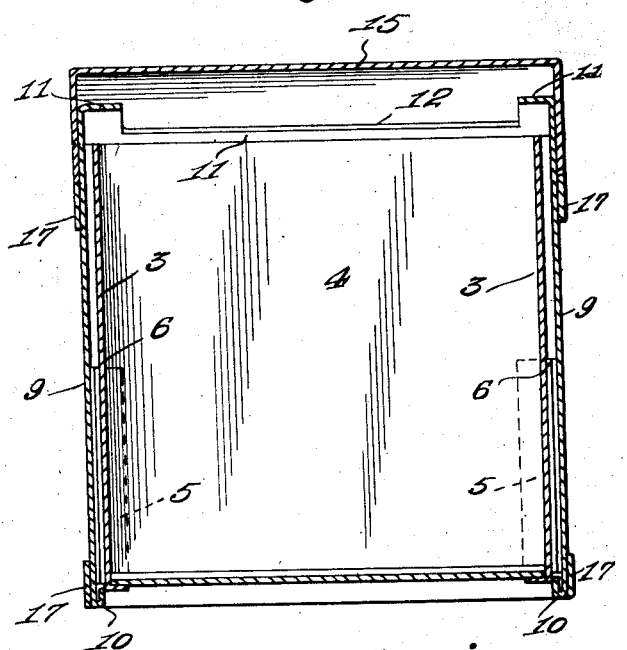
R. M. Cormican,
INVENTOR
BY Victor J. Evans
ATTORNEY Oct. 9, 1928.
R. M. CORMICAN
1,687,427
COMBINATION TRUNK AND LUGGAGE CARRIER
Filed Sept. 23, 1927   2 Sheets-Sheet 2
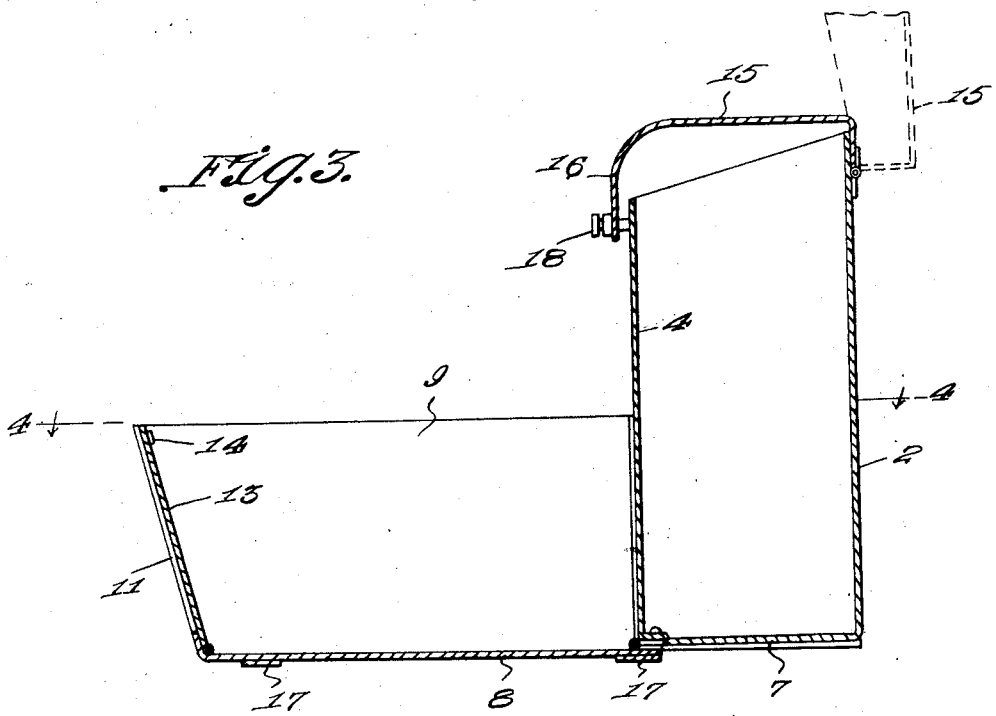
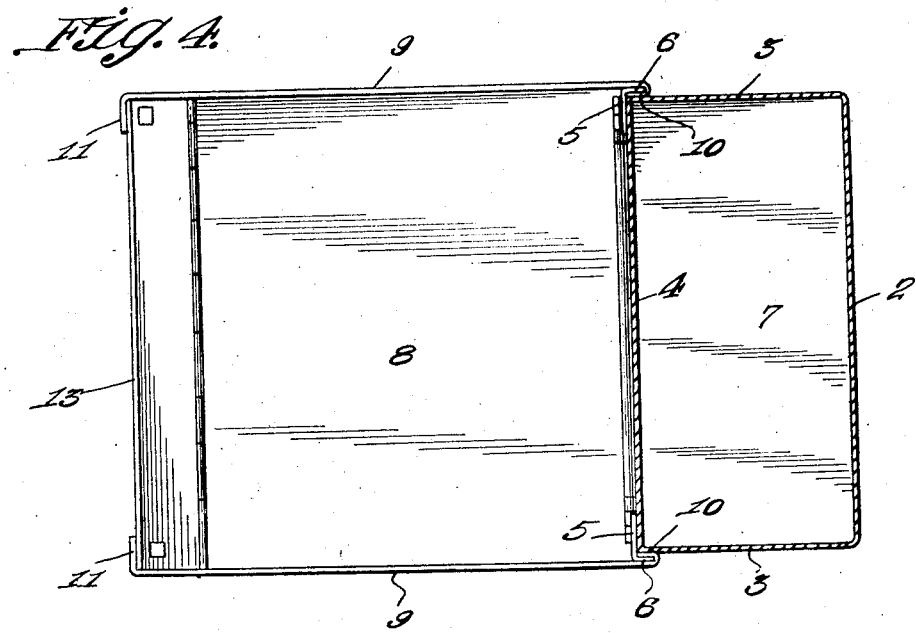
R. M. Cormican,
INVENTOR
BY Victor J. Evans
ATTORNEY Patented Oct. 9, 1928.

1,687,427

UNITED STATES PATENT OFFICE.

ROBERT M. CORMICAN, OF CASEY, ILLINOIS.

COMBINATION TRUNK AND LUGGAGE CARRIER. REISSUED

Application filed September 23, 1927. Serial No. 221,561.

This invention relates to vehicle trunks, and its general object is to provide a trunk adapted to be fixed to the rear of a motor vehicle and has a luggage carrier foldably associated therewith in a manner whereby the trunk cooperates with the luggage carrier for carrying the same in folded or open position.

A further object of the invention is to provide a combined trunk and luggage carrier of the character above set forth, that is capable of carrying a great amount of material in a safe and secure manner, yet is neat in appearance regardless of whether or not the carrier is in its folded or open position.

Another object of the invention is to provide a trunk and luggage carrier for a motor vehicle, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a fragmentary side elevation of a motor vehicle showing the device which forms the subject matter of the present invention applied thereto.

Figure 2 is a vertical sectional view taken through the device in folded position.

Figure 3 is a similar view thereof in open position, and showing the top closed in full lines and open in dotted lines.

Figure 4 is a sectional view taken approximately on line 4—4 of Figure 3, looking in the direction of the arrows.

Figure 5 is a sectional view taken approximately on line 5—5 of Figure 2, looking in the direction of the arrows.

Referring to the drawings in detail, it will be noted that the device is supported upon a platform 1 extending from the rear of the vehicle as shown, and the device includes a receptacle in the form of the usual vehicle trunk. The receptacle is formed with a rear wall 2 arranged in confronting engagement with the back of the vehicle, side walls 3 and front wall 4. The side walls 3 are inclined so as to dispose the upper edge of the rear wall above the upper edge of the front wall as best shown in Figure 3 of the drawings.

Secured to the front wall and at its juncture with the side walls of the trunk and extending from the bottom and terminating adjacent the central portion thereof are strips 5 of substantially cross sectional L-shape formation with portions 6 disposed in spaced relation with respect to the side walls as best shown in Figure 4. Hingedly secured to the bottom 7 of the trunk for movement in a vertical plane is one edge of the bottom 8 of the luggage carrier as shown, and formed with the bottom 8 of the luggage carrier are the side walls 9 thereof which have their inner edges bent upon themselves to provide tongues 10 adapted to receive the portions 6 and be disposed between said portions and the side walls 3 for supporting the luggage carrier in its open position.

The luggage carrier is also provided with a wall 11 formed at the free end of the bottom and side walls 9 thereof, and this wall 11 has its greatest portion cut away to provide a recess 12 for a purpose which will be presently apparent. The recess is closed by a door 13 hingedly secured to the bottom 8 and said door is adapted to be disposed in closed position when the luggage carrier is arranged in its open position as shown in Figures 3 and 4. The door may be detachably secured in its closed position through the instrumentality of snap fasteners 14.

Hingedly secured to the rear wall 2 of the trunk is a flanged cover 15, and the cover is of a size to position the forward flange 16 thereof in spaced relation with the front wall 4 of the trunk when the luggage carrier is disposed in open position, but when the carrier is arranged in folded position, the forward flange 16 as well as the side flanges thereof engage the free end portion of the bottom and the sides of the luggage carrier as shown in Figure 2 of the drawings. The luggage carrier is provided with reinforcing strips 17 formed at the secured end and free end thereof and the reinforcing strip which is arranged at the free end thereof provides a stop for the cover of the trunk. When the device is disposed in folded position, the bottom of the luggage carrier provides the front of the device and in order to arrange the luggage carrier in folded position, the door 13 is positioned in contacting engagement with the bottom 8 and the carrier is disposed upwardly on its hinges and telescopically receives the trunk as shown, and when in this position, the recess 12 in the wall 11 provides the means of access to the interior of the trunk.

The cover may be secured in closed position by any appropriate securing means and I have illustrated a latch 18 for this purpose.

From the above description and disclosure in the drawings it will be obvious that I have provided a combined trunk and luggage carrier adapted to be supported at the rear of a vehicle in the usual manner, and provides a neat appearance regardless of whether or not the device is in folded or open position. Due to the novel construction of the luggage carrier and it its association with the trunk, it will in no way affect the use of the trunk when in folded position or when disposed to its open position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An attachment for motor vehicles, comprising a trunk including a rear wall, front wall, side walls and a bottom, a luggage carrier including side walls, a bottom and a front wall said front wall being recessed, a door for closing said recess, said luggage carrier being hingedly secured for movement in a vertical plane, and telescopically receiving said trunk when arranged in closed position, said luggage carrier being disposed in a horizontal position when open, and a cover for said trunk and capable of retaining said luggage carrier in its folded position.

In testimony whereof I affix my signature.

ROBERT M. CORMICAN.